US011937073B1

(12) United States Patent
Mobin

(10) Patent No.: US 11,937,073 B1
(45) Date of Patent: Mar. 19, 2024

(54) SYSTEMS AND METHODS FOR CURATING A CORPUS OF SYNTHETIC ACOUSTIC TRAINING DATA SAMPLES AND TRAINING A MACHINE LEARNING MODEL FOR PROXIMITY-BASED ACOUSTIC ENHANCEMENT

(71) Applicant: AudioFocus, Inc, Oakland, CA (US)

(72) Inventor: Shariq Mobin, Oakland, CA (US)

(73) Assignee: AudioFocus, Inc, Oakland, CA (US)

( * ) Notice: Subject to any disclaimer, the term of this patent is extended or adjusted under 35 U.S.C. 154(b) by 0 days.

(21) Appl. No.: 18/386,165

(22) Filed: Nov. 1, 2023

Related U.S. Application Data

(60) Provisional application No. 63/421,425, filed on Nov. 1, 2022.

(51) Int. Cl.
*H04S 7/00* (2006.01)
*G10L 21/0208* (2013.01)

(52) U.S. Cl.
CPC .......... *H04S 7/305* (2013.01); *G10L 21/0208* (2013.01); *H04S 7/301* (2013.01); *H04S 7/40* (2013.01); *G10L 2021/02082* (2013.01); *H04S 2400/11* (2013.01)

(58) Field of Classification Search
None
See application file for complete search history.

(56) References Cited

U.S. PATENT DOCUMENTS

| | | | | |
|---|---|---|---|---|
| 11,089,426 | B2 * | 8/2021 | Eronen | H04S 7/305 |
| 11,514,928 | B2 * | 11/2022 | Souden | G10L 21/0232 |
| 11,546,692 | B1 * | 1/2023 | Delikaris Manias | H04S 7/303 |
| 11,671,784 | B2 * | 6/2023 | Schissler | H04S 7/305 381/303 |
| 2021/0089926 | A1 * | 3/2021 | Nakajima | G10H 1/366 |
| 2021/0158799 | A1 * | 5/2021 | Zhang | G10L 15/20 |
| 2022/0036903 | A1 * | 2/2022 | Cilingir | G10L 17/04 |
| 2022/0337952 | A1 * | 10/2022 | Neoran | H04S 7/307 |
| 2023/0007232 | A1 * | 1/2023 | Yoshida | H04S 7/303 |
| 2023/0013370 | A1 * | 1/2023 | Li | G10L 21/02 |
| 2023/0239642 | A1 * | 7/2023 | Li | H04N 7/15 381/300 |
| 2023/0298593 | A1 * | 9/2023 | Ramos | G06N 3/088 704/233 |
| 2023/0401789 | A1 * | 12/2023 | Shang | H04S 7/302 |

* cited by examiner

*Primary Examiner* — Paul W Huber

(74) *Attorney, Agent, or Firm* — Padowithz Alce; Alce PLLC

(57) ABSTRACT

A system and method includes generating a virtual n-dimensional space that includes one or more positions of one or more source nodes and a position of a receiver node; executing a plurality of simulations including simulating acoustic signals emanating from the one or more source nodes within the virtual n-dimensional room; estimating a measure of the acoustic signals received at the receiver node; computing a plurality of acoustic signal data samples based on the estimation for each of the plurality of simulations; and creating a training data corpus for training an artificial neural network, the training data corpus including at least a sampling of the plurality of acoustic data samples, and the artificial neural network, once trained, is configured to generate an inference indicating a likely intended sound to a target receiver of a mixture of acoustic signals.

17 Claims, 4 Drawing Sheets

SYSTEMS AND METHODS FOR CURATING A CORPUS OF SYNTHETIC ACOUSTIC TRAINING DATA SAMPLES AND TRAINING A MACHINE LEARNING MODEL FOR PROXIMITY-BASED ACOUSTIC ENHANCEMENT

CROSS-REFERENCE TO RELATED APPLICATIONS

This application claims the benefit of U.S. Provisional Patent Application No. 63/421,425, filed 1 Nov. 2022, which is incorporated in its entirety by this reference.

TECHNICAL FIELD

This invention relates generally to the hearing support technology field, and more specifically to a new and useful system and method for curating training data for a machine learning model that delineates and amplifies a desired, target sound within a hearing support device in the hearing support technology field.

BACKGROUND

Modern hearing support devices, such as hearing aids, can provide support for acoustically-challenged persons or situations by amplifying all sounds reaching the hearing support devices. A technical problem with such hearing support devices may include a non-differentiation between noise (e.g., construction noise) and a desired target sound (e.g., speech). That is, both noise and a desired sound may be amplified by these hearing support devices without any delineation or discrimination of noise. The most challenging version of this is when the noise is also speech-based (e.g., a stranger talking loudly at another table in a restaurant), where it becomes unclear which speech is desired and which speech is noise from the perspective of the user. This is the 'cocktail party problem.'

Thus, there is a need in the hearing support field to create improved methods and systems for delineating a desired target sound from noise in order to amplify that target sound.

SUMMARY OF THE INVENTION(S)

Figure 1:
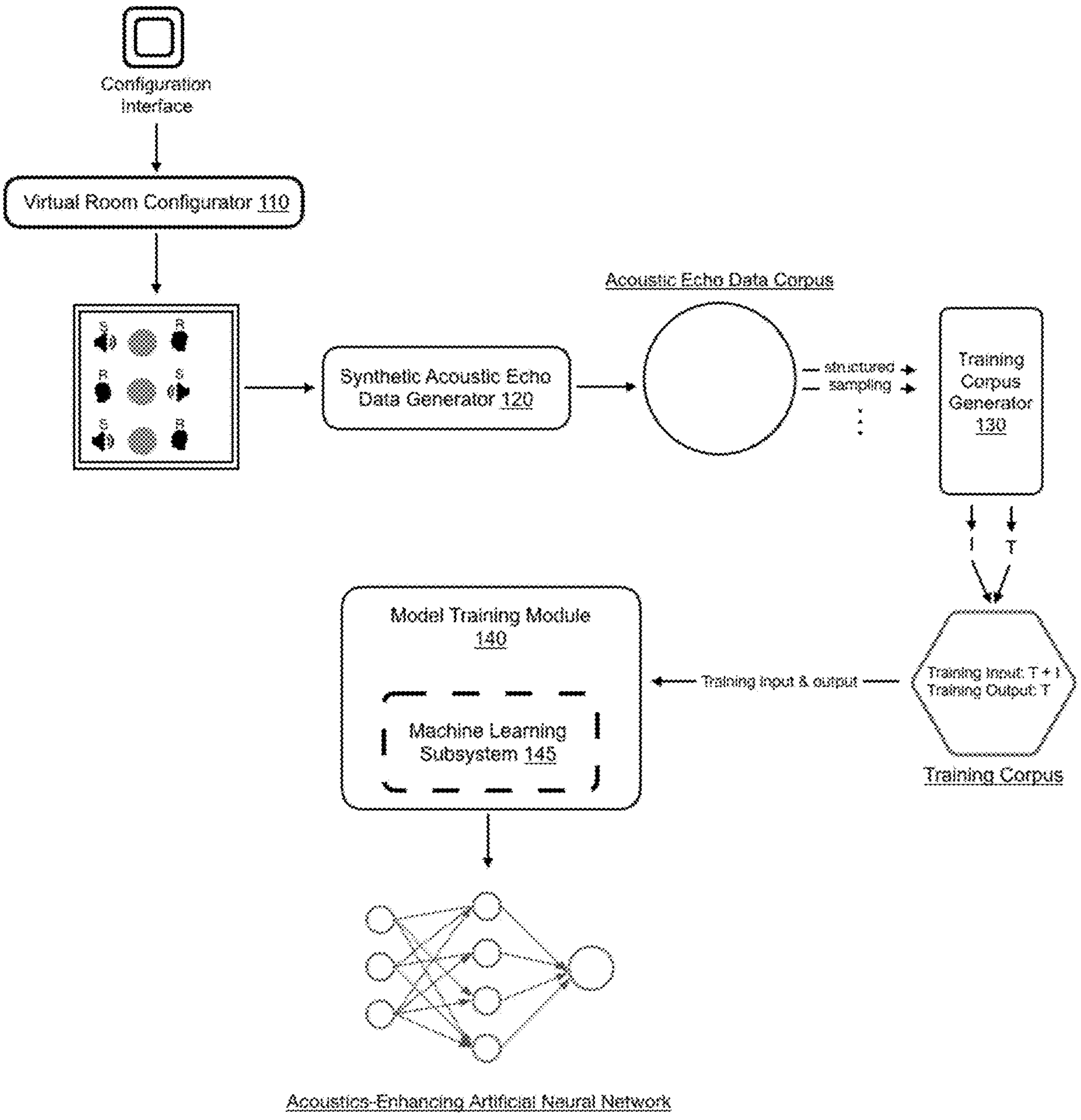
FIG. 1 illustrates a schematic representation of a system wo in accordance with one or more embodiments of the present application.

In one embodiment, a method for synthesizing acoustic data signals for configuring an acoustics-enhancing machine learning model includes generating a virtual three-dimensional room that includes a position of one or more sources of sound and a position of a receiver of sound; executing, by a computer, a plurality of simulations including simulating acoustic signals emanating from the position of the one or more sources of sound within the virtual three-dimensional room; estimating, for each of the plurality of simulations, a measure of the acoustic signals received at the position of the receiver of sound; computing a plurality of acoustic signal data samples based on the estimation for each of the plurality of simulations; and creating a machine learning training corpus for training a target machine learning model, the machine learning training corpus constructed using a structured sampling of the plurality of acoustic data samples, and the target machine learning model, once trained, is configured to generate an inference indicating a likely target sound from an input mixture of acoustic signals that include target sounds the receiver desires to hear and interfering sounds the receiver does not desire to hear.

In one embodiment, the one or more sources of sound include a source of sound producing desired acoustic signals at the position of the receiver of sound, and a desired subset of the plurality of acoustic signal data samples includes acoustic data samples of sounds the receiver desires to hear.

In one embodiment, the one or more sources of sound include a source of sound producing interferer acoustic signals interfering with the desired acoustic signals, and an interferer subset of the plurality of acoustic signal data samples includes acoustic data samples of sounds interfering with the desired acoustic signals.

In one embodiment, creating the machine learning training corpus includes: sampling one or more of the desired acoustic signals from the desired subset, sampling one or more of the interferer acoustic signals from the interferer subset of the plurality of acoustic data samples, and forming composite acoustic data samples based on combining the desired acoustic signals with the interferer acoustic signals.

In one embodiment, creating the machine learning training corpus includes sampling acoustic signals from one or more sound sources within a predetermined distance (e.g., 1 meter) of the receiver in order to form the desired subset while sampling acoustic signals from one or more sound sources from beyond the predetermined distance (e.g., 1 meter) of the receiver to form the interfering subset. The resultant machine learning model would correspond to a 'proximity-based enhancement' algorithm, which enhances nearby speech and suppresses far-away, which would be a candidate solution to the 'cocktail party problem.'

In one embodiment, creating the machine learning training corpus includes sampling acoustic signals from one or more sound sources that only contain speech to form the desired subset while sampling acoustic signals from one or more sound sources that only contain non-speech (e.g., construction noise) to form the interferer subset. The resultant machine learning model would correspond to a 'speech enhancement' algorithm which suppresses all non-speech sounds (e.g., music, construction noise, etc.).

In one embodiment, creating the machine learning training corpus includes sampling acoustic signals from the plurality of acoustic data samples that only contain directed acoustic energy (i.e., energy directly from a source to a receiver) to form the desired subset while sampling reverberant acoustic energy (i.e., all energy that reached the receiver through reflections off of surfaces) to form the interferer subset. The resultant machine learning model will be a dereverberation algorithm which removes reverberation, similar to echoes, from sound.

In one embodiment, creating the machine learning training corpus includes composing more than one of the above methods, e.g., doing proximity-based enhancement in combination with speech enhancement and dereverberation, but many others are possible.

In one embodiment, the target machine learning model includes a supervised artificial neural network, the method further includes training the supervised artificial neural network using the composite acoustic data samples.

In one embodiment, the receiver of sound simulates an acoustics-enhancing device having at least one input sensor arranged in a substantially direct path of sounds the receiver desires to hear and at least one input sensor arranged in a substantially indirect path of sounds the receiver desires to hear.

In one embodiment, the method includes integrating a software application with an acoustics-enhancing device, the software application executing the target machine learning model, once trained, to compute inferences that delineate a target sound signal from an input mixture of sound including a combination of the desired target sound signal and interfering sound signals.

In one embodiment, the method includes generating, by the software application, an instruction to the acoustics-enhancing device to amplify the desired target sound signal based on the inferences of the target machine learning model.

In one embodiment, generating the virtual three-dimensional room includes: setting the position of the receiver of sound within the virtual three-dimensional room; setting a position of a source of sound of the one or more sources of sound within the virtual three-dimensional room, the position of the source of sound being distinct from the position of the receiver of sound, the source of sound simulates an emanation of desired acoustic signals; setting a position of at least one source of sound of the one or more sources of sound within the virtual three-dimensional room, the at least one source of sound simulates an emanation of interfering acoustic signals; and configuring one or more fixed components of the virtual three-dimensional room that define echo dynamics of the virtual three-dimensional room.

In one embodiment, generating the virtual three-dimensional room includes: setting the position of the receiver of sound within the virtual three-dimensional room; setting a position of a source of sound of the one or more sources of sound within the virtual three-dimensional room, the position of the source of sound being distinct from the position of the receiver of sound, the source of sound simulates an emanation of desired acoustic signals; and configuring one or more fixed components of the virtual three-dimensional room that define echo dynamics of the virtual three-dimensional room.

In one embodiment, the rate, or velocity, at which acoustic energy spreads around the room may be configured to vary according to temperature, humidity, or other conditions of the virtual or physical room.

In one embodiment, each of the plurality of acoustic signal data samples includes a distinct model of dynamics of the simulated acoustic signals as measured from the position of the receiver of sound.

In one embodiment, the distinct model of dynamics of the simulated acoustics signals includes a two-dimensional representation having a first axis representing an amount of acoustic energy and a second axis representing time.

In one embodiment, the distinct model of dynamics of the simulated acoustic signals includes an illustration of a measure of an impulse from a source of sound of the one or more sources of sound and reverberations of the impulse as the reverberations arrive at the receiver of sound.

In one embodiment, if the receiver of sound includes a plurality of simulated input sensors for detecting the acoustic data signals, the method further includes computing a distinct model of dynamics of the simulated acoustic signals for each of the plurality of simulated input sensors of the receiver of sound.

In one embodiment, a method includes generating a virtual n-dimensional space that includes one or more positions of one or more source nodes and a position of a receiver node; executing, by a computer, a plurality of simulations including simulating acoustic signals emanating from the one or more source nodes within the virtual n-dimensional room; estimating, for each of the plurality of simulations, a measure of the acoustic signals received at the receiver node; computing a plurality of acoustic signal data samples based on the estimation for each of the plurality of simulations; and creating a training data corpus for training an artificial neural network, the training data corpus including at least a sampling of the plurality of acoustic data samples, and the artificial neural network, once trained, is configured to generate an inference indicating a likely intended desired target sound from a mixture of acoustic signals that include target sounds and sounds interfering with the target.

In one embodiment, the receiver node simulates an acoustics-enhancing device having at least one input sensor arranged in a substantially direct path of desired sounds and at least one input sensor arranged in a substantially indirect path of desired sounds.

In one embodiment, the method includes integrating a software application with an acoustics-enhancing device, the software application executing the artificial neural network, once trained, to compute inferences that delineate a desired target sound signal from an input mixture of sound including a combination of the target sound signal and interfering sound signals.

In one embodiment, the method includes generating, by the software application, an instruction to the acoustics-enhancing device to amplify the target sound signal based on the inferences of the artificial neural network.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Machine Learning-Based Acoustics-Enhancement

As shown in FIG. 1, a system 100 for generating a training corpus of synthetic acoustic training samples includes a virtual room generator 110, synthetic acoustic echo data generator 120, a training corpus generator 130, a model training module 140, and a machine learning subsystem 145.

The virtual room generator 110 may be configured to enable a user or system to create virtual three-dimensional rooms having various configurations including wall placements, entity placements (e.g., sound sources, '5', and receivers, 'R'), and materials and/or physical properties of virtual components or elements within the virtual room. In one or more embodiments, the virtual room generator 110 may include a graphical user interface (GUI) for configuring a virtual room including various GUI objects that enables a selection and/or a design of any component or entity within a given virtual room.

The synthetic acoustic echo data generator 120 may be configured to generate acoustic echo data samples and/or acoustic data models based on performing one or more simulations within a given virtual 3D room. In a preferred embodiment, the synthetic acoustic echo data generator 120 comprises a ray-tracing engine or an acoustics-tracing engine that may function to simulate acoustic impulses and trace the energy of the acoustic impulses as it arrives or its calculated effect on a receiver of sound. In one or more embodiments, the synthetic acoustic echo data generator 120 may include any suitable acoustic simulation subsystem and/or algorithm including, but not limited to, beam tracing algorithms and/or engines, wave-tracing algorithms and/or engines, acoustic radiance transfer (ART), image source method, finite element method, boundary element method, finite-difference time-domain method, digital waveguide mesh, and/or any suitable variation or combination thereof. The synthetic acoustic echo data generator 120 may be further configured to simulate a source emission directivity pattern (e.g., sound from in front of a speaker is louder in the front than the back). With the source emission pattern, multiple directions of each source can also be simulated (e.g., face left vs. right inside the room). Similarly, system 120 may be configured to include a receiver directivity pattern (e.g., sounds from in front of a person are louder to that person compared to sounds from behind because the ear blocks sound from behind). Multiple directions of the receiver can also be simulated inside the room. Further, each receiver may be configured to have 1 or more input sensors (microphones) which each collect acoustic data samples which may aid model training.

The training corpus generator 130 may be configured to generate acoustic data samples from a composition of the acoustic echo data samples generated by 120 and one or more audio datasets which may each include audio from various sound classifications (e.g., speech, music, construction noise, etc.). These acoustic data samples may then be assembled into training data based on constructing compositions of acoustic data samples without interferer sources of sound or acoustics together with acoustic data samples with interferer sources of sound or acoustics. In one or more embodiments, the training corpus generator 130 may function to implement any suitable data sampling technique (as described herein below) to produce synthetic acoustic data samples for various acoustic circumstances for training one or more target machine learning algorithms.

The model training module 140 may be configured to implement a training of a target machine learning algorithm using one or more training corpora sourced from the training corpus generator 130 and once trained, perform a validation testing of the training machine learning model.

Additionally, or alternatively, the machine learning subsystem may implement one or more ensembles of trained machine learning models or a single, global machine learning model. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), (generative) adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

Figure 2:
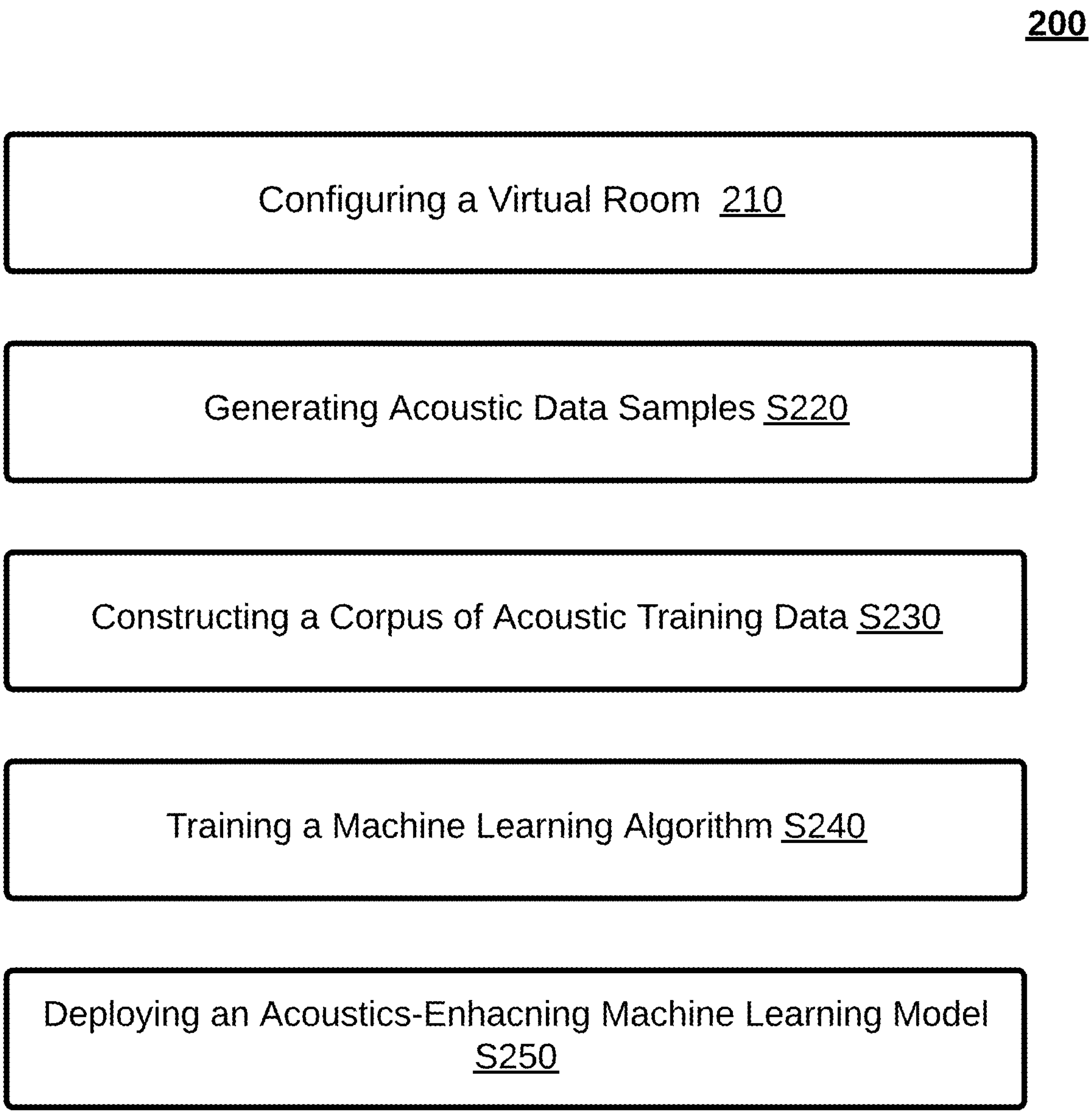
FIG. 2 illustrates an example method 200 in accordance with one or more embodiments of the present application.

2. Method for Curating Synthetic Training Data and Configuring an Acoustics-Enhancing Neural Network As shown by reference to FIG. 2, a method 200 for generating a corpus of synthetic acoustic data for training a target machine learning model includes configuring a multi-dimensional virtual room 210, generating acoustic echo data samples S220, generating a corpus of training data samples S230, training an acoustics-enhancing machine learning model S240, and implementing a machine learning-enhanced hearing support device S250.

2.10 Virtual Room Configuration

S210, which includes configuring a virtual room, may function to create or build a virtual three-dimensional (3D) room for acoustic echo data generation. In a preferred embodiment, a virtual 3D room may be configured to enable a simulation of sound from a source to a receiver via a direct path and indirect paths that involve one or more reflections of the sound off surfaces in the virtual 3D room. That is, in one or more embodiments, the virtual 3D room sets a digitally-created circumstance in which a sound impulse generated from each source results in acoustic echo data samples, or an 'impulse response', at each receiver of sound.

Configuring a virtual 3D room, in one or more embodiments, may include configuring or setting one or more required, fixed components of the virtual room. The one or more required, fixed components of the virtual room preferably relate to basic or standard components that may define a typical room including, but not limited to, a floor, a ceiling, and walls. In one or more embodiments, at least the walls of a given virtual room may include an unlimited number of variations, in terms of the position and extent of each wall of the room. Similarly, in some embodiments, a ceiling and a floor of a virtual room may be configured to include various sizes, shapes (e.g., uneven floors, ceilings, or the like) and features (e.g., smooth or rough, popcorn ceilings, and the like). In some embodiments, the configuration of the one or more fixed components (e.g., the size, shape, and features of each fixed component) may determine (or, alternatively, may be based on) a size and shape of the virtual 3D room.

In one or more embodiments, configuring the one or more required, fixed components may include configuring one or more materials of each (or any) of the one or more fixed components (e.g., materials including, but not limited to, wood, drywall, glass, brick, concrete, and/or the like). Additionally, or alternatively, in one or more embodiments, configuring the one or more required, fixed components may include configuring or setting one or more physical properties of each (or any) of the one or more fixed components (e.g., sound reflectance properties, roughness properties, and/or any other suitable component property). It shall be noted that, in some embodiments, the one or more physical properties of a fixed component may be determined by or based on the configured material for the fixed component; that is, in some embodiments, configuring the material of a fixed component may be sufficient to configure the one or more physical properties of the fixed component.

Additionally, or alternatively, configuring a virtual 3D room may include configuring one or more variable or non-standard components of a room including, but not limited to, fixtures, furniture, floor coverings, and/or the like. In one or more embodiments, S210 may function to enable a configuration of a virtual room to include any suitable combination of variable or non-standard components at one or more locations within the virtual room. As a non-limiting example, S210 may enable a configuration of a virtual room in which a floor covering, such as carpet or hardwood, may be set and in which one or more tables may be positioned throughout different positions within the virtual room.

In various embodiments, configuring the one or more variable or non-standard components may include configuring one or more materials of each (or any) of the one or more variable or non-standard components (e.g., materials including, but not limited to, wood, drywall, glass, brick, concrete, and/or the like). Additionally, or alternatively, in one or more embodiments, configuring the one or more variable or non-standard components may include configuring or setting one or more physical properties of each (or any) of the one or more variable or non-standard components (e.g., sound reflectance properties, roughness properties, and/or any other suitable component property). It shall be noted that, in some embodiments, the one or more physical properties of a variable or non-standard component may be determined by or based on the configured material for the variable or non-standard component; that is, in some embodiments, configuring the material of a variable or non-standard component may be sufficient to configure the one or more physical properties of the variable or non-standard component.

S210 may additionally or alternatively enable a configuration of a virtual 3D room with one or more receiver nodes (i.e., receivers of sound) and one or more source nodes (i.e., sources of sound). In one or more embodiments, each of the one or more receiver nodes may represent an entity wearing a device (e.g., a person wearing a hearing aid or the like) that may be capable of receiving or recording acoustics produced within the virtual room. In one or more embodiments, each of the one or more source nodes may represent an entity (e.g., a person) or anything that may be capable of producing acoustics within the virtual room (e.g., music, a door slam, or a dish crashing into the floor).

2.20 Acoustic Simulations|Echo Data Derivation

Figure 3:
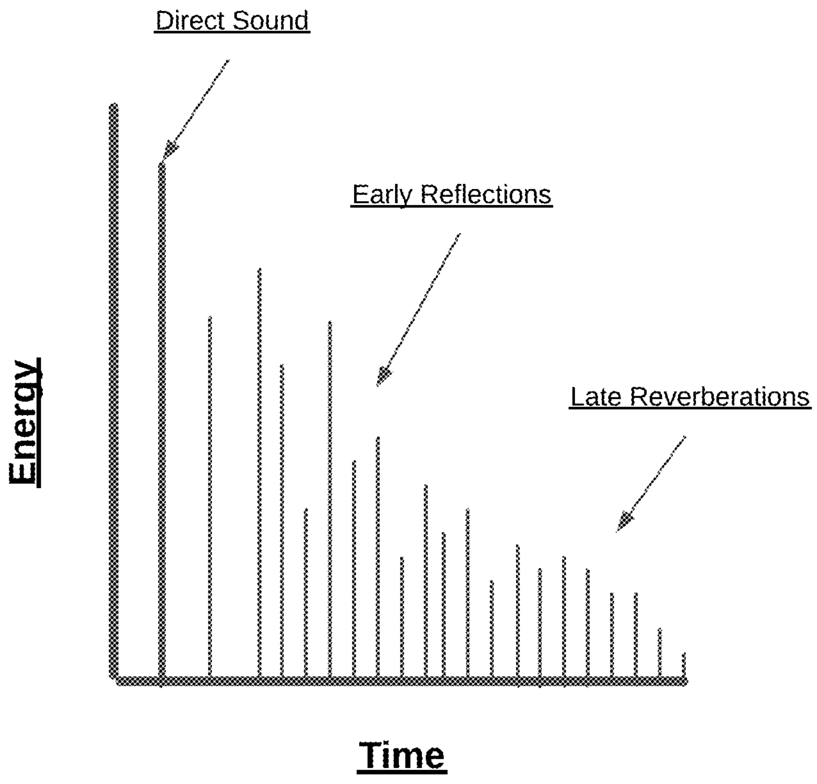
FIG. 3 illustrates an example impulse response acoustic signature in accordance with one or more embodiments of the present application.

Given a virtual 3D room configuration via method 210, S220 may function to generate acoustic echo data samples for each unique combination of a source of sound and a receiver of sound inside the 3D room. The acoustic echo data samples capture the energy received at a receiver over time as a result of a single impulse sound emitted from the source and is thus called an 'impulse response'. See FIG. 3 for an example which includes one high energy direct sound (straight from the source to the receiver), a few medium energy early reflections (reflections of sound off of 1 to 3 surfaces before reaching the receiver), and many low energy late reflections (reflections of sound off of more than 3 walls). These reflections may be referred to as reverberations or echoes. S220 generates these impulse responses using models of how sound energy changes as a result of traveling through the air, reflecting off of surfaces, and refracting through the human head as will be described below. This computation is very expensive in time and computational cost and S220 serves to pre-compute a huge dataset of impulse responses so that S230 can quickly generate training data samples for training a machine learning model in a practical amount of time and computational cost.

In one or more embodiments, S220 may function to implement an acoustics simulation engine (e.g., a ray tracing engine or the like) for producing acoustic echo data samples based on an input of a virtual 3D room together with one or more simulation parameters. In the case of ray-tracing, S220 is capable of simulating more than a million rays for dozens of reflections by parallelizing the computation across n GPUs or similar computers, limited only by the computational power and memory of the computing platform. In addition, it may compute the acoustic echo data samples from multiple unique (source, receiver) pairs simultaneously.

In one of more embodiments, S220 may function to model the effects different material types have on the resultant acoustic energy that arrives at the receiver. For each material type (e.g., glass, wood, drywall, etc.) there may be a different set of coefficients that describe how different frequencies (e.g., low vs high) attenuate as a result of a reflection of a sound ray. In a preferred embodiment, S220 may function to use the Vorlander reflection coefficients. During the traversal of the ray from the source to the receiver, the sequence of materials encountered may be tracked. After computing the acoustic echo data samples, or impulse response, as a result of traveling through the air medium, the impulse response may be composed with the coefficients of every material encountered to get a new impulse response, called a 'room impulse response (RIR)' which reflects the room's effect on the impulse response.

For sound source emission modeling, modeling the emission and refraction properties of vocal cords, mouths, and human flesh may be beyond capabilities of an acoustic simulation engines. Accordingly, a coefficient database may be used in the place of outputs of an acoustic simulation engine to describe the relative energy differences across different orientations (e.g., horizontal azimuth angle, and vertical elevation angle) and frequencies. In a preferred embodiment, human voice directivity patterns are used and are modeled by utilizing voice directivity coefficients from the Pörschmann database. For interpolating coefficients at angles and frequencies not in the database bilinear interpolation may be used. Once an acoustic ray reaches a receiver, the original source emission orientation of that ray may be looked up so that the correct directivity coefficients can be utilized. Once found, the directivity coefficients are composed with the room impulse response (RIR) to calculate a new room impulse response that factors the source orientation.

For simulating the source facing different directions, the vocal directivity pattern may be transformed (e.g., rotated in the azimuth and elevation planes) to match the different face directions. Thus, if a sound source faces right, they will be loudest to the right and vice versa if the sound source faces left.

For receiver directivity and microphone-array modeling, modeling the refraction properties of the human head, i.e., the "head shadow effect", and intricate pattern of the outer ear, i.e., the pinna, are also beyond the capabilities of acoustic simulation engines so a similar, but slightly different, coefficient database may be used for receiver modeling. S220 utilizes a Head-Related Transfer Function (HRTF) dataset which is data recorded from the real world across many human subjects wearing a plurality of microphones, or 'microphone array', that may correspond to the microphones on a hearing support device. In the preferred embodiment the OlHeaD HRTF dataset may be used. This database has a unique coefficient for each receiver orientation, frequency, and input sensor (microphone). Since the human head or ear may often be placed between pairs of microphones, each microphone can capture a very distinct signal due to the occlusion and refraction effects of the human head and ear. Once an acoustic ray reaches a receiver the orientation that it is received at is calculated in order to look up the relevant HRTF coefficients. This is then composed with the room impulse response (RIR) computed from factoring in the source orientation. The resultant signal is called a 'binaural room impulse response (BRIR).'

In one or more embodiments a new HRTF dataset may be collected with a non-standard placement of microphones not seen in other datasets. In some such embodiments, the one or more distinct microphone positions may be calibrated or configured optimally for different individuals as the size, shape, and pinna pattern of individuals' ears has high variance. This calibration or configuration of one or more distinct microphone positions may enable an improved accuracy of an acoustic output of method 200. As a non-limiting example, in some embodiments, S220 may function to configure at least one posterior microphone position at a posterior ear location behind each ear of each receiver node (i.e., at least two posterior microphone positions for receiver nodes with two ears), and at least one anterior microphone position at an anterior ear location forward of each ear of each receiver node (i.e., at least two anterior microphone positions for receiver nodes with two ears). In such an example, the microphone positions may be computed and/or configured based on head size, ear shape, ear location, ear size, and/or any other suitable receiver feature for calculating anterior and posterior locations on ears of simulated individuals.

For simulating the receiver facing different directions, the HRTF data coefficients may be transformed (e.g., rotated in the azimuth and elevation planes) to match the different face directions. Thus, if a receiver faces right sounds from the right will be louder compared to if the receiver was facing left.

In a preferred embodiment, S220 may function to index all acoustic echo data samples with metadata that describes how the acoustic data samples were generated including the relevant 3D room model, the source position, the source orientation, the subject name of the head sampled from the HRTF dataset, the receiver position, and the receiver orientation. This metadata can then be used by S230 to do structured sampling of acoustic signals to compose a desired target and interference noise signals according to a task configuration given to S230.

2.30 Acoustic Training Corpus Synthesizing

Figure 4:
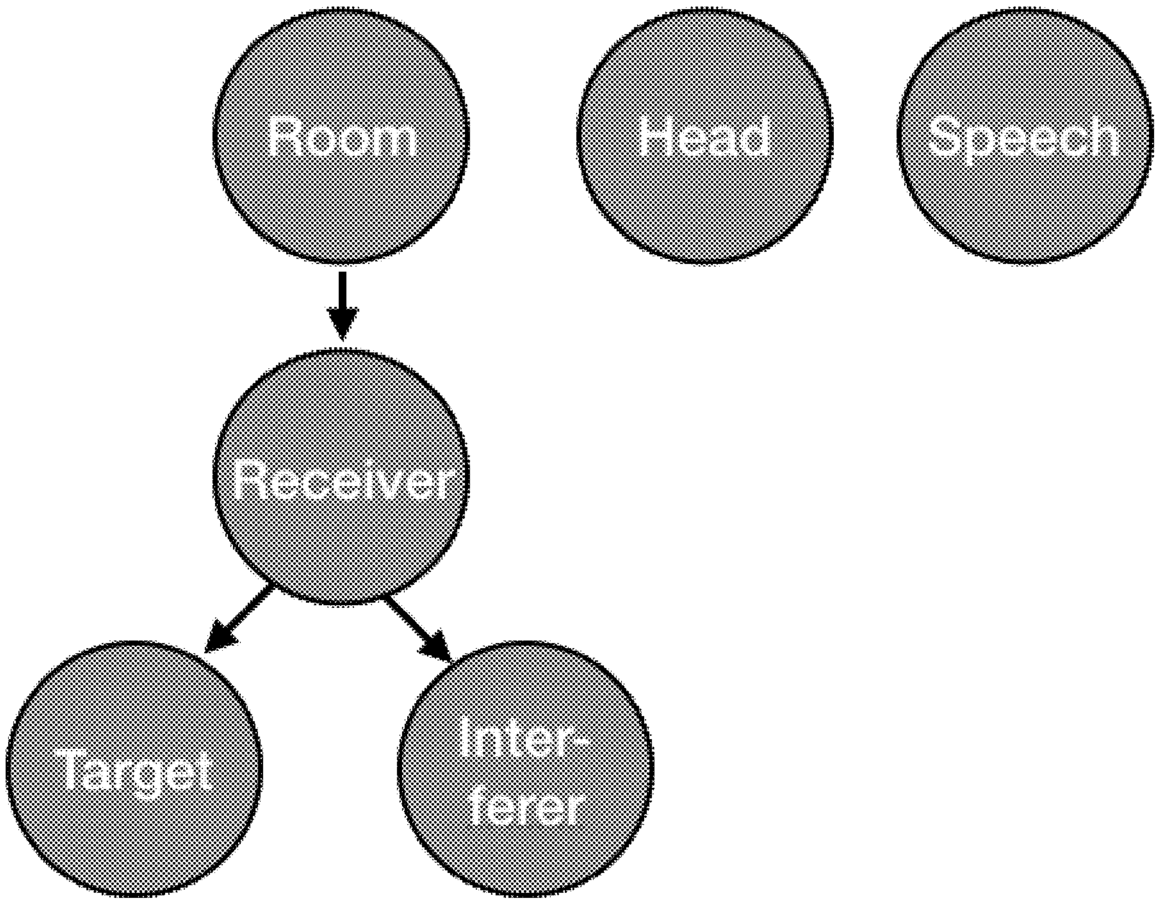
FIG. 4 illustrates an example statistical model for sampling in accordance with one or more embodiments of the present application.

At least one purpose of S230 is to collect the structured, acoustic echo data samples, or binaural room impulse response (BRIR) data, from the S220 generator and create a diverse set of training data for training a machine learning to enhance desired target sounds and suppress interfering noise sounds. By capturing a diversity of rooms, source positions and orientations, head shapes, and receiver positions and orientations in the training data the model stands the best chance of working in the complex auditory environments of the real-world. In a preferred embodiment, S230 samples data generated by S220 in a series of conditional samples according to the statistical graphical model shown by way of example in FIG. 4. The generation of one training example via this sampling scheme is described below:

In a preferred embodiment of amplifying nearby voices, S230 functions as follows: First a 3D room may be uniformly sampled from the available rooms in the acoustic echo data corpus. Next a receiver position and orientation may be uniformly sampled conditioned on the sampled room. An available HRTF receiver head may also be uniformly sampled. Now the set of candidate target source positions may be found conditioned on the receiver position, e.g., computed by finding all available source positions in the room that are within a predetermined distance (e.g., 1 meter) of that receiver position. A similar set of candidate interferer source positions may be computed that are beyond the predetermined distance (e.g., 1 meter). Next, 1 or 2 target positions and orientations may be uniformly sampled from the candidate target positions. Analogously, between 1 and 12 interferer positions and orientations may be sampled from the candidate interferer positions and orientations. Based on the number of target and interferer positions, an equivalent number of unique speech samples may be sampled from a speech dataset, e.g., LibriSpeech. All acoustic echo data samples which correspond to the chosen receiver head, target position and orientations, and interferer positions and orientations may then be read from the S220 generated acoustic echo data corpus and convolved with the unique speech samples to generate audio for all targets and interferers. The desired target sound may be computed from superimposing all target sounds together. The undesired interferer noise may be generated analogously. A training input, or 'mixture', can then be generated by superimposing the desired target sound with the undesired interferer sound. The training output may be the desired target sound. In this way a single training example may be generated for feeding into a machine learning system for training. Informally, the training input mixture corresponds to a loud, noisy cafe, while the training output corresponds to a very quiet cafe where only the receiver and a few nearby speakers are talking.

In a preferred embodiment the acoustic echo data samples used for the target may only contain the direct sound energy, leaving out all room reflections, in order for the machine learning model to learn 'dereverberation', or echo removal.

In a preferred embodiment the acoustic echo data samples used for the target may only contain the direct sound energy and one or more, but not all, room reflections, in order for the machine learning model to learn 'partial dereverberation', or partial echo removal.

In such preferred embodiment, the plurality of distinct synthetic compositions of acoustic data samples preferably emulates a variety of circumstances in which there are both target and interfering sounds from a wide variety of angles with respect to the receiver. The structured, conditional, uniform sampling of room, receiver, target, and interferer information leads to this variety.

In such embodiments, sampling the one or more corpora of speech data samples may enable a diversity of words, speech accents, speech cadences, and/or the like across a plurality of distinct individuals.

In addition, sampling the same speech dataset for target and interferer audio ensures that the machine learning learns to enhance sounds based on proximity to the receiver and not based on speaker identity or any other information.

In such embodiments, the sampling of various receiver heads ensures that the machine learning model can robustly enhance audio across a spectrum of head shapes, head sizes, ear shapes, ear sizes, and microphone array placements. By including this diversity in the training data, it can be ensured that users within the bounds of this diversity should be able experience the full benefits of the machine learning model.

Additionally, or alternatively, S230 may function to generate distinct training corpora for varying acoustic circumstances. For instance, S230 S230 may function to construct a distinct training corpus of composite acoustic training samples for circumstances along a spectrum of noisiness. In such an example, for circumstances in a quieter setting along a spectrum of noisiness, S230 S230 may function to include fewer interferer sources to reduce the total volume of the noise. Conversely, to create training samples for circumstances in noisier settings along the spectrum of noisiness, S230 may function to sample from more interferer sources to increase the total volume of noise.

2.40 An Acoustics-Enhancing Artificial Neural Network|Model Training

S240, which includes training a machine learning algorithm, may function to train a target machine learning algorithm using the training corpus of composite acoustic data samples. In a preferred embodiment, the target machine learning algorithm may include an artificial neural network configured to compute regression-based inferences. Once trained, the target machine learning algorithm may be implemented as an acoustics-enhancing machine learning model capable of computing inferences that delineate a target sound from a mixture of sound that may include a combination of the target sound and interferer sounds.

In one or more embodiments, training the machine learning algorithm may include training a single or global artificial neural network that may be acoustic circumstance agnostic. In such embodiments, the training of the machine learning algorithm may include training with a training corpus that include synthetic composites of acoustic data samples with sound dynamics that vary along a noisiness spectrum or the like. That is, the training samples may include quiet composite acoustic data samples and relatively (high) noisy acoustic data samples. Accordingly, the single or global machine learning algorithm, once trained, may function to produce target sound inferences for a variety of circumstances (e.g., quiet to noisy circumstances or the like).

Additionally, or alternatively, in some embodiments, training the machine learning algorithm may include training multiple distinct artificial neural networks in which S240 may function to train a distinct neural network using a training corpus configured for a distinct acoustic circumstance. In such embodiments, S240 may implement multiple distinct trainings for each distinct machine learning algorithm with a distinct training corpus thereby enabling each distinct machine learning to optimally compute acoustic inferences or target sound inferences for a distinct target circumstance. In one or more embodiments, S240 may function to implement a combination of the trained machine learning models in an acoustic-enhancing ensemble of machine learning models that operate in concert to produce an acoustic or target sound inference.

Additionally, or alternatively, in some embodiments, S240 may function to train the machine learning algorithm using a training corpus that may include training data samples based on one or more distinct microphone positions. In some such embodiments, S240 may function to train the machine learning algorithm based on a number of acoustic data inputs for each training data sample that may correspond to a number of distinct microphone positions. Accordingly, in such embodiments, the machine learning algorithm, once trained, may function to produce target sound inferences based on acoustic data inputs from one or more distinct microphones arranged at one or more distinct positions, where each distinct microphone may be in a distinct acoustic path relative to a source of sound.

Additionally, or alternatively, once an acoustics-enhancing machine learning model has been trained during an initial training phase, S240 may function to perform validation testing. In one or more embodiments, S240 may function to validate a predictive performance of the acoustics-enhancing machine learning model using a corpus of real-world acoustic data samples. Additionally, or alternatively, S240 may function to perform validation testing of the acoustics-enhancing machine learning model using a subset or holdout set of composite acoustic data samples of the training corpus.

Accordingly, once acoustics-enhancing machine learning model is trained and satisfies one or more validation thresholds (e.g., minimum predictive accuracy) or similar efficacy metrics, S240 may function to indicate that the machine learning model may be ready for a production environment, as described herein (e.g., S250).

2.50 Target Sound Inference|Target Sound Enhancement

S250, which includes implementing an acoustics-enhancing machine learning model, may function to implement the acoustics-enhancing machine learning model in combination with a hearing support device, such as a hearing aid or the like. In one or more embodiments, S250 may function to integrate the acoustics-enhancing machine learning model within a target hearing support device. Additionally, or alternatively, S250 may function to implement the acoustics-enhancing machine learning model in a distinct device (e.g., a mobile device, a mobile phone, a computer, a remote server, etc.) that may work in cooperation with a hearing support device to produce target sound inferences.

Accordingly, in use, a hearing support device implementing the acoustics-enhancing machine learning model may function to receive or record, as input, a mixture of sound and the like. Based on the input mixture of sound, S250 may function to extract features from the mixture of sound and may function to generate an acoustic model or an acoustic signal model for the mixture sound, which may be given as input to the acoustics-enhancing machine learning model. Responsively, based on the input of the extracted features, the acoustics-enhancing machine learning model may function to compute a target sound or target acoustics inference that preferably delineates a likely or probable desired sound or desired acoustic signal.

Additionally, or alternatively, once a desired acoustic signal may be identified, S250 may implement the hearing support device to amplify or scale up the desired acoustic signal thereby increasing the desired signal-to-noise ratio and enabling a listener using the hearing support device to hear with increased clarity a desired sound.

In some preferred embodiments, a hearing support device or the like implementing the acoustics-enhancing machine learning model may function to receive and/or direct acoustic data input from one or more microphones associated with or arranged on a listener using the hearing support device. In some preferred embodiments, the one or more microphones may include at least two microphones associated with each ear of the listener (e.g., at least four microphones per listener), although it shall be noted that various embodiments may include one or more microphones for each ear. In some such embodiments, the one or more microphones may include at least one anterior or forward-facing microphone positioned on or at the front of each ear of the listener (e.g., forward or in front of the outer ear, or pinna, of each ear), and at least one posterior or rearward-facing microphone positioned behind or at a rear of each ear of the listener (e.g., behind or rearward of the outer ear, or pinna, of each ear). In such embodiments, each microphone may have a distinct acoustic path to one or more sources of sound in the listener environment based on one or more acoustic path factors including, but not limited to, the microphone position relative to the source of sound, the structure of the ear, and the structure of the head of the listener. For example, in such embodiments, posterior microphones may be occluded from forward sources of sounds by the structure of the ear while anterior microphones may have direct acoustic paths to forward sources of sounds. In such embodiments, the acoustics-enhancing machine learning model may function to produce the target sound or target acoustics inference based on the distinct acoustic data input of each of the one or more microphones. Such embodiments may preferably enable an increase or improvement in a signal-to-noise ratio performance of the acoustics-enhancing machine learning model, as well as provide an improved listener experience in noisy environments.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

I claim:

1. A method of synthesizing acoustic data signals for configuring an acoustics-enhancing machine learning model, the method comprising:

generating a virtual three-dimensional room that includes one or more positions of one or more sources of sound and a position of a receiver of sound;

executing, by a computer, a plurality of simulations including simulating acoustic signals emanating from the one or more positions of the one or more sources of sound within the virtual three-dimensional room;

estimating, for each of the plurality of simulations, a measure of the acoustic signals received at the position of the receiver of sound;

computing a plurality of acoustic signal data samples based on the estimation for each of the plurality of simulations, wherein:

the one or more sources of sound include a source of sound producing desired acoustic signals at the position of the receiver of sound, a desired subset of the plurality of acoustic signal data samples includes acoustic data samples of sounds the receiver of sound desires to hear, the one or more sources of sound include a source of sound producing interferer acoustic signals interfering with the desired acoustic signals, an interferer subset of the plurality of acoustic signal data samples includes acoustic data samples of sounds interfering with the desired acoustic signals; and creating a machine learning training corpus for training a target machine learning model, the machine learning training corpus comprising at least a sampling of the plurality of acoustic data samples, and the target machine learning model, once trained, is configured to generate an inference indicating a likely target sound from an input mixture of acoustic signals that includes target sounds desired by the receiver and interfering sounds that interfere with the target sounds intended for the receiver, wherein creating the machine learning training corpus includes:

sampling acoustic data samples from one or more sources of sound of the one or more sources of sound that are positioned within a predetermined distance of the position of the receiver of sound to form the desired subset, and sampling acoustic data samples from one or more sources of sound of the one or more sources of sound that are positioned beyond the predetermined distance of the position of the receiver of sound to form the interfering subset; and wherein the target machine learning model, once trained using the machine learning training corpus, comprising a proximity-based enhancement machine learning model that enables an enhancement of nearby speech while suppressing far-away speech.

2. The method according to claim 1, wherein:

the plurality of acoustic data samples includes (A) the desired subset comprising acoustic data samples produced by a desired source of sound of the one or more sources of sound and (B) a non-desired subset comprising acoustic data samples produced by an interfering source of sound of the one or more sources of sound;

creating the machine learning training corpus further includes:

sampling one or more acoustic data samples from the desired subset of the plurality of acoustic data samples, sampling one or more acoustic data samples from the non-desired subset of the plurality of acoustic data samples, and forming composite acoustic data samples based on combining the acoustic data samples sampled from the desired subset with the acoustic data samples sampled from the non-desired subset.

3. The method according to claim 1, wherein:

creating the machine learning training corpus includes:

sampling acoustic data samples from one or more sources of sound of the one or more sources of sound that produce only speech signals to form the desired subset, and sampling acoustic data samples from one or more sources of sound of the one or more sources of sound that produce only non-speech signals to form the interfering subset; and the target machine learning model, once trained using the machine learning training corpus, comprising a speech enhancement machine learning model that enables a suppression of non-speech signals.

4. The method according to claim 1, wherein creating the machine learning training corpus includes:

sampling acoustic data samples from the plurality of acoustic data samples that only contain acoustic energy directed toward the position of the receiver of sound to form the desired subset, sampling acoustic data samples from the plurality of acoustic data samples that only contain acoustic energy that is reverberant to form the interferer subset, the target machine learning model, once trained using the machine learning training corpus, comprising a dereverberation enhancement machine learning model that enables a removal of reverberated acoustic signals.

5. The method according to claim 1, wherein the target machine learning model comprises a supervised artificial neural network, the method further comprises training the supervised artificial neural network using the composite acoustic data samples.

6. The method according to claim 1, wherein the receiver of sound simulates an acoustics-enhancing device having at least one input sensor arranged in a substantially direct path of sounds the receiver desires to hear and at least one input sensor arranged in a substantially indirect path of sounds the receiver desires to hear.

7. The method according to claim 1, further comprising:

integrating a software application with an acoustics-enhancing device, the software application executing the target machine learning model, once trained, to compute inferences that delineate a target sound signal from an input mixture of sound comprising a combination of the target sound signal and interfering sound signals.

8. The method according to claim 7, further comprising:

generating, by the software application, an instruction to the acoustics-enhancing device to amplify the target sound signal based on the inferences of the target machine learning model.

9. The method according to claim 1, wherein generating the virtual three-dimensional room includes:

setting the position of the receiver of sound within the virtual three-dimensional room;

setting a position of a source of sound of the one or more sources of sound within the virtual three-dimensional room, the position of the source of sound being distinct from the position of the receiver of sound, the source of sound simulates an emanation of desired acoustic signals;

setting a position of at least one source of sound of the one or more sources of sound within the virtual three-dimensional room, the at least one source of sound simulates an emanation of interfering acoustic data signals; and configuring one or more fixed components of the virtual three-dimensional room that define echo dynamics of the virtual three-dimensional room.

10. The method according to claim 1, wherein generating the virtual three-dimensional room includes:

setting the position of the receiver of sound within the virtual three-dimensional room;

setting a position of a source of sound of the one or more sources of sound within the virtual three-dimensional room, the position of the source of sound being distinct from the position of the receiver of sound, the source of sound simulates an emanation of desired acoustic signals; and configuring one or more fixed components of the virtual three-dimensional room that define echo dynamics of the virtual three-dimensional room.

11. The method according to claim 1, wherein each of the plurality of acoustic signal data samples comprises a distinct model of dynamics of the simulated acoustic signals as measured from the position of the receiver of sound.

12. The method according to claim 11, wherein the distinct model of dynamics of the simulated acoustics signals comprises a two-dimensional representation having a first axis representing an amount of acoustic energy and a second axis representing time.

13. The method according to claim 11, wherein the distinct model of dynamics of the simulated acoustic signals comprises an illustration of a measure of an impulse from a source of sound of the one or more sources of sound and reverberations of the impulse as the reverberations arrive at the receiver of sound.

14. The method according to claim 11, wherein if the receiver of sound includes a plurality of simulated input sensors for detecting the acoustic data signals, the method further comprises computing a distinct model of dynamics of the simulated acoustic signals for each of the plurality of simulated input sensors of the receiver of sound.

15. A method comprising:

generating a virtual n-dimensional space that includes one or more positions of one or more source nodes and a position of a receiver node;

executing, by a computer, a plurality of simulations including simulating acoustic signals emanating from the one or more source nodes within the virtual n-dimensional room;

estimating, for each of the plurality of simulations, a measure of the acoustic signals received at the receiver node;

computing a plurality of acoustic signal data samples based on the estimation for each of the plurality of simulations, wherein:

the one or more source nodes include a source node producing desired acoustic signals at the position of the receiver node, a desired subset of the plurality of acoustic signal data samples includes acoustic data samples of sounds the receiver node desires to hear, the one or more sources nodes include a source node producing interferer acoustic signals interfering with the desired acoustic signals, an interferer subset of the plurality of acoustic signal data samples includes acoustic data samples of sounds interfering with the desired acoustic signals; and creating a training data corpus for training an artificial neural network, the training data corpus comprising at least a sampling of the plurality of acoustic data samples, and the artificial neural network, once trained, is configured to generate an inference indicating a likely intended sound to a target receiver of a mixture of acoustic signals that include sounds directed toward the target receiver and sounds interfering with the sounds directed toward the target receiver, wherein creating the training data corpus includes:

sampling acoustic data samples from one or more source nodes of the one or more source nodes that are positioned within a predetermined distance of the position of the receiver node to form the desired subset, and sampling acoustic data samples from one or more source nodes of the one or more source nodes that are positioned beyond the predetermined distance of the position of the receiver node to form the interfering subset; and wherein the artificial neural network, once trained using the training data corpus, comprises a proximity-based enhancement artificial neural network that enables an enhancement of nearby speech while suppressing far-away speech.

16. The method according to claim 15, wherein the receiver node simulates an acoustics-enhancing device having at least one input sensor arranged in a substantially direct path of sounds directed toward the position of the receiver node and at least one input sensor arranged in a substantially indirect path of sounds directed toward the position of the receiver node.

17. The method according to claim 16, further comprising:

integrating a software application with an acoustics-enhancing device, the software application executing the artificial neural network, once trained, to compute inferences that delineate a target sound signal an input of a mixture of sound comprising a combination of the target sound signal and interfering sound signals.

* * * * *